3,126,264
APPARATUS FOR THE SEMI-ISOTHERMAL ADSORPTION OF GASEOUS IMPURITIES IN THE CRYOGENIC TEMPERATURE RANGE
Jerzy Damsz, Crestwood, Tuckahoe, N.Y., assignor to North American Philips Company, Inc., New York, N.Y., a corporation of Delaware
Filed Oct. 26, 1960, Ser. No. 65,099
1 Claim. (Cl. 55—387)

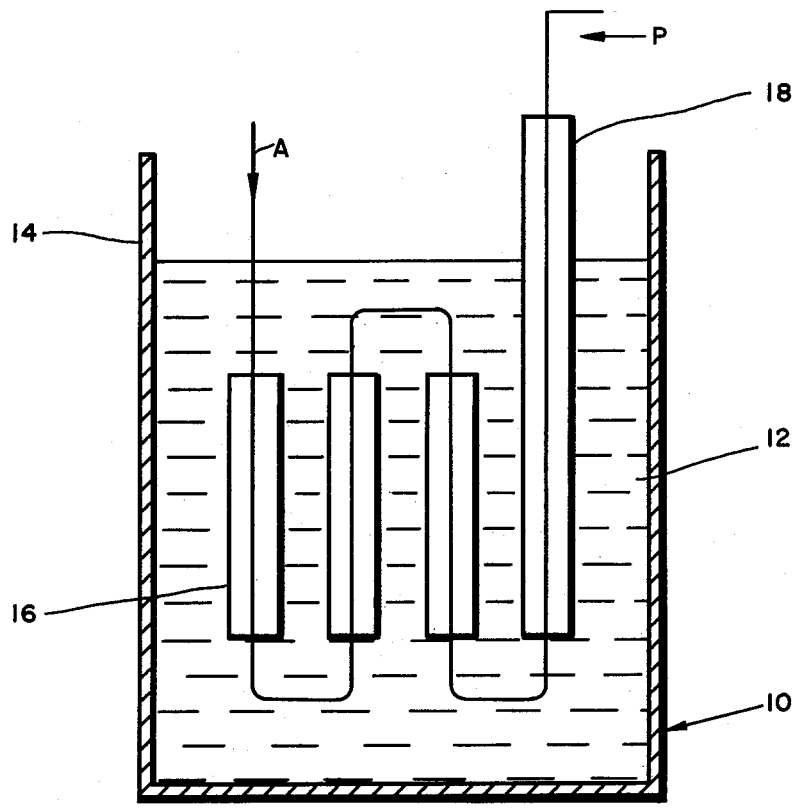

The present invention relates to an apparatus and method for improving the efficiency of the adsorption-desorption cycle in installations for purification of gases by adsorption operating in the cryogenic temperature range.

An object of the present invention is the provision of a purging cycle through an adsorber with a warm stream in which part of the adsorber projects out of the submerged receptacle and is contacted first by the purging stream whereby the gas that enters the submerged part of the adsorber previously has removed from the projecting part the larger part of the impurities therein due to the higher temperature therein.

Another object of the present invention is the use of a smaller amount of purging gas than is used in isothermal processes and in which the overall efficiency is higher, and the purity of the product is improved.

The above and other features, objects and advantages of the present invention will be fully understood from the following description considered in connection with the accompanying illustrative drawings in which the sole figure is a diagrammatic view of an adsorber constructed in accordance with the teachings of the present invention.

Referring to the drawing in which is shown an adsorber referred to generally by the numeral 10 having a liquid gas such as liquid nitrogen 12 filling a major part of the container 14. The liquid gas 12 continuously maintains the adsorber at a given low temperature. The adsorber bed 16 has a portion 18 representing about 15% of the volume of the adsorber bed projecting out of the low temperature bath. During the adsorption flow, which is represented by the arrow A, the portion 18 is the end or the last part of the adsorber contacted during the adsorption flow. During the reverse purging flow, which is represented by the arrow P, the purging gas enters the projecting portion 18 initially before it traverses the remainder of the adsorber bed. The semi-isothermal adsorption process operates as follows: The impure gas flows under a given pressure in the direction of the arrow A through a heat exchanger (not shown) and then through adsorber bed 16. The impurities are trapped in the adsorber bed and the pure product collected from the end of the projecting portion 18. The flow in accordance with arrow A is stopped after a period of time and the direction of flow is reversed by means of reversing valves (not shown) and the high pressure gas is released from the adsorber bed. The purge gas flow indicated by arrow P is a low pressure warm stream which is permitted to flow through the adsorber bed, removing the impurities. The length of time for purifying should be equal to the time for adsorption. During the adsorption period the mass flow of gas through adsorber bed 16 is much greater than during the purging, and the warm end of the adsorber is cooled down in a shorter time than the warming-up time during the purging cycle. The submerged part of the adsorber bed 16 adsorbs isothermally the impurities and the clean cold stream of gas traverses the projecting portion 18. During the first part of the adsorption period the projecting portion 18 of the adsorber does not adsorb impurities but is merely cooled down. When the submerged isothermal part becomes saturated and the impurities start a "breakthrough" the projecting portion 18 is already cooled down and adsorbs the impurities giving a high purity product. It should be noted that some of the liquid nitrogen in the container 14 evaporates and passes through the heat exchanger (not shown) and is liquefied therein and subsequently returned to the receptacle 14.

In the purging cycle, a warm stream of low pressure gas first enters the projecting portion 18 and the remainder of the adsorber bed 16. The purge flow does not pass through the heat exchanger (not shown). In the projecting portion 18 of the adsorber, the amount of remaining impurities is related to the temperature and pressure while in the submerged part of the adsorber bed the process is isothermal and the amount of impurities which remain in the adsorber is related to the pressure only. Thus, when the temperature is higher the purging is more efficient. For example, a particular construction used an adsorber bed of silica gel having a total length of 104 inches, a total volume of 128 cu. inches and a total weight of 3.35 lbs. The length of the projecting portion was 13 inches. The gas used was hydrogen and the purity of the hydrogen product was 99.07% with only about 300 p.p.m. of nitrogen as an impurity.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claim.

What I claim is:
An adsorber for the semi-isothermal adsorption of gaseous impurities in the cryogenic temperature range comprising a container having an adsorber bed submerged in liquid gas and provided with a portion representing between 10% and 20% of the volume of said adsorber bed projecting out of said liquid gas dependent upon mass flow and pressure relative to the length and volume of said adsorber bed, said projecting portion being the end part of said adsorber bed taken in the direction of the adsorption flow.

References Cited in the file of this patent
UNITED STATES PATENTS

| | | |
|---|---|---|
| 2,545,194 | Colburn et al. | Mar. 13, 1951 |
| 2,827,775 | Linde | Mar. 25, 1958 |
| 2,954,677 | Simonet | Oct. 4, 1960 |

OTHER REFERENCES

"Advances in Cryogenic Engineering," volume 1 (Timmerhaus), published by Plenum Press, Incorporated, New York, 1960, Proceedings of the 1954 Cryogenic Engineering Conference (Johnson et al. article on pages 329–341 relied on).